April 20, 1965 F. NESH 3,179,823
TRANSDUCER FOR DISSIPATION AND DETECTION
OF HIGH FREQUENCY VIBRATORY ENERGY
Filed Jan. 30, 1962 4 Sheets-Sheet 1

INVENTOR.
FLORENCE NESH
BY
Ernest J Weinberger
ATTORNEY

INVENTOR.
FLORENCE NESH
BY Ernest J Weinberger
ATTORNEY 3,179,823
TRANSDUCER FOR DISSIPATION AND DETECTION OF HIGH FREQUENCY VIBRATORY ENERGY
Florence Nesh, Otis Gardens, 1445 Otis Place NW., Apt. 122, Washington, D.C.
Filed Jan. 30, 1962, Ser. No. 169,978
12 Claims. (Cl. 310—8.4)
(Granted under Title 35, U.S. Code (1952), sec. 266)

The invention described herein may be manufactured and used by or for the Government of the United States of America for governmental purposes without the payment of any royalties thereon or therefor.

This invention relates to the dissipation of vibratory energy, and particularly in vehicles such as missiles and other space vehicles. This application is a continuation-in-part of application Serial Number 26,658, filed May 3, 1960.

In the journal "Missiles and Rockets" for September 14, 1958, on page 7, there occurs a statement that scientists have found that silent, high frequency sounds given off by large rocket space vehicle boosters may injure the health of launching crews, that since sounds have been found to cause stomach ulcers and reproductive disorders in animals, and that efforts were being made to avoid this danger to the health of the launching crews by the use of effective mufflers for the big rockets.

An object of this invention is to provide a simple, practical and relatively inexpensive transducer system for effectively converting and dissipating the vibratory energy normally given off by vibrating bodies such as space vehicles and their boosters, in a manner that will avoid any danger to the health of the launching crews, which will not materially interfere with the usual handling and launching of such vehicles, and which may be employed to reduce the effect of high frequency vibrations in other objects where such vibrations are troublesome.

Other objects and advantages will appear from the following description of the invention, and the novel features will be particularly pointed out hereinafter in connection with the appended claims.

Figure 1:
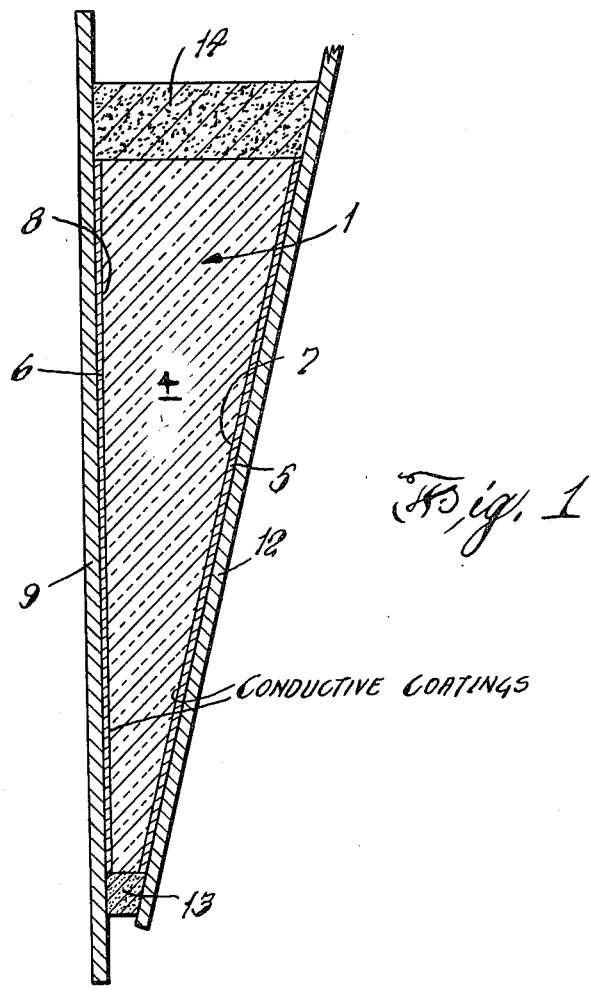
FIG. 1 is an elevation, in section illustrating one embodiment of the invention before it is applied to the vibrating wall.

In the illustrated embodiment of FIG. 1, the transducer 1 is formed of a body 4 of any suitable electrostrictive or piezoelectric material such as, for example, of quartz crystals, Rochelle salt crystals, ammonium dihydrogen phosphate crystals, and certain ceramic materials such as barium titanate, lead titanate-lead zirconate, barium titanate with a small amount of lead titanate or calcium titanate, and tourmaline. Any electrostrictive material may be used. This body 4 is preferably of wedge shape with opposite, diverging faces 5 and 6 that carry electroded layers or coatings 7 and 8. These coatings may be provided in any suitable manner, one of which is by condensing vaporized metals such as gold or silver upon the divergent faces of the body, or by painting the divergent faces of the body with a silver paint and baking it. The electroded layers are usually applied after the body has been fired. Other methods of providing the electrode surfaces are by evaporating, electroplating, or electrodepositing the metal on the opposite divergent faces. Barium titanate is gaining wide use as an electrostrictive material, because it manifests large electrostrictive effects when its molecular electric dipoles are oriented by means of a polarizing voltage, and because it has a high dielectric constant and relatively low impedance, resistance to moisture, ruggedness, ability to operate over wide temperature ranges, is of low relative cost per unit surface area, and can be easily produced in a great variety of sizes and shapes. The body 4 with its electroded layers or surfaces is polarized in a direction between the layers.

One of the divergent, electroded faces, such as 6, of the body 4 is caused to abut, face to face and flat against a metal plate 9, such as of brass or copper. Another similar metal plate 12 is disposed face to face and flat against the electroded surface or layer 7 of the other divergent face 5 of body 4, and bodies 13 and 14 of a suitable insulating cement are disposed at the larger and smaller ends of the body 4 and connect the plates 9 and 12. These cement bodies unite the plates 9 and 12 against separation and in confining relation to the electrostrictive body 4, so that the plates 9 and 12 and body 4 with its electroded layers 7 and 8 form a unit acting as the transducer 1. Any suitable electrically insulating cement may be used for the cement bodies 13 and 14 but the well-known epoxy and acrylic types of cements are useful for the cement bodies 13 and 14 and for the cement layer 11.

In the subsequently discussed figures, like elements bear reference numerals similar to those of FIG. 1. In the illustrated embodiment of the invention of FIG. 2, the electrostrictive or piezoelectric transducer 1 is attached, in any suitable manner, to a wall 2 of a space vehicle, its booster, or another vibrating object so that vibrations of the wall acting on the transducer will be converted in the transducer into electric energy in the form of electric currents. These created electric currents are passed through a utilization circuit 3 where the electric energy is dissipated. The plate 9 may be secured to wall 2 by screws 10, and preferably also by a layer 11 of electrically insulating adhesive or cement interposed between the plate 9 and wall 2. The cement layer 11 provides a very secure contact between the abutting surfaces of plate 9 and wall 2. If there are air bubbles or air layers between the plate 9 and wall 2, it interferes with the response of the transducer to the vibrations in wall 2, and the cement eliminates the possibility of having such interposed air bubbles or air layers between plate 9 and wall 2. In order to provide proper electrical insulation the screws 10 may be of an insulating plastic or the threaded portion can be insulated by any number of simple expedient methods. On the other hand, the cement may be eliminated and the plate electrically connected to the wall provided this plate is employed as the ground terminal and the other plate is not grounded.

The insulating bodies 13' and 14' are disposed between the ends of plates 9 and 12 which extend beyond the edges of the transducer body and further extend around the plate 12 also covering the outer face of this plate. This arrangement in effect completely insulates the plate 12 except for the wire 15 which is attached thereto and passes through body 13' to form an exterior electrical connection to the plate. Wire 16 attached to plate 9 provides the other terminal of the transducer and these wires are terminated in a dissipative or utilization circuit 3.

A closed metal casing 30 encloses the transducer and extends beyond, confining therein in abutting relation to the outer portion of the cement 31 adjacent the open face of the plate 12, an inertial element 32 and a number of resilient yielding members 33 which urge the element into contact with the outer cement portion. These members bear against the element and are supported by the rear wall 34 of the casing 30. In this case, the members 33 take the form of springs but other materials may be substituted therefor as for example elastomeric pads or shock absorbers. The casing is provided with a flange 35 through which supporting screws 10 pass and is provided with an electrically insulating backing 36. Wire 15 emanates from the interior of casing 30 through opening 37 so that except for this opening the entire assembly is completely enclosed. The inertial element surfaces loosely about the inner casing walls and thereby permit the element to be displaced or move lengthwise of the casing while the resilient members urge it in the direction of the transducer body. The inertial element as herein shown may be of any heavy massive nondeformable material such as lead, iron etc., but as described hereinafter other configurations may be employed to advantage.

When the missile or vehicle, or its booster, having a wall such as 2 is launched, the wall 2 will vibrate at a very high frequency or emit ultrasounds, and such vibrations will be applied to the transducer body 4 and the entire casings 30. As these vibrations occur in a direction lengthwise of the casing the inertial element 32 will maintain its abutting relationship with the cement layer 31 and thereby in effect with the transducer body itself. This is true due to the fact that as the casing and the transducer tend to move outwardly of the wall 2 the inertial element resists its own displacement by way of its inertial mass and the resisting forces of the springs 33, it thereby in effect compresses the transducer between plates 9 and 12 producing a charge or voltage to appear between the electroded layers. By dissipating this electrical energy which was generated by or converted from the movement or vibration of the wall 2, the vibrational energy of the wall is substantially reduced with the attendant reduction of harmful radiated high frequency energy. The utilization or dissipative circuit generally represented at 3 may take the simple form of a resistor whose resistance is aproximately equal to the electrical impedance of the transducer so that the maximum transfer of energy will occur. By employing a selectively variable resistance it is a relatively simple matter to adjust the resistance to obtain the maximum heating in the resistor. On the other hand, the same determination may be made in a test setup before the assembly is affixed to the wall 2 and a variable reactive element added to the circuit 3 to further provide the proper impedance matching. Since a missile or vehicle carries a number of electrically energized instruments and other devices used in conjunction with the launching and the flight the electrical energy supplied by the transducer could be gainfully employed therein by simply rectifying the transducer current.

Figure 3:
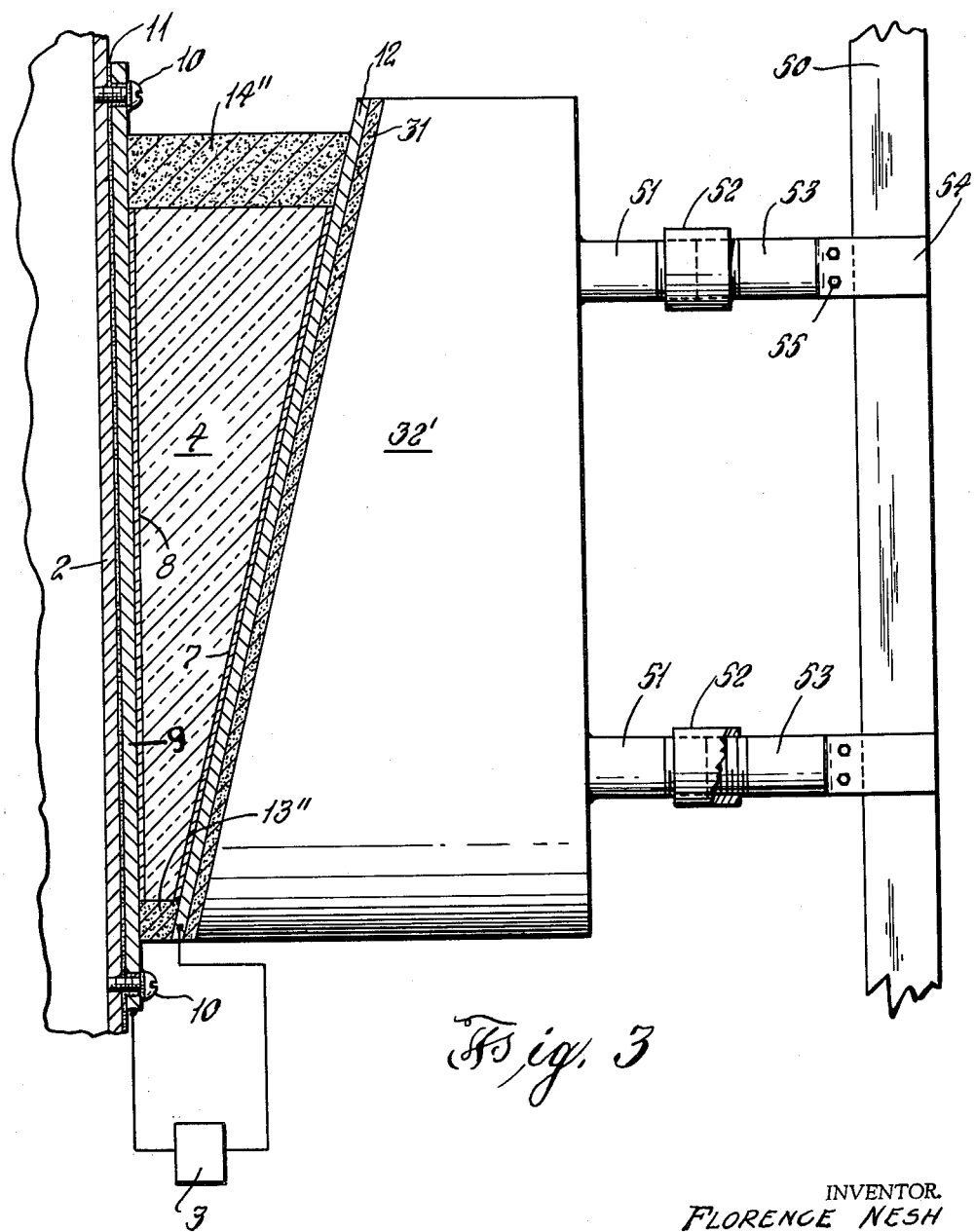
FIG. 3 is another application similar to that of FIG. 2.

In another embodiment, as illustrated in FIG. 3, the transducer body 4 is similarly flanked by plates 9 and 12 which are electrically insulated from each other, from the wall 2, and the inertial mass 32′ by insulating cement 11, 31, 13″ and 14″. The screws 10 are insulated from the plate 9 by an insert so as to prevent electrical contact therethrough from the plate to wall. In order to provide a mass against which the transducer is to be compressed upon being vibrated, the structural portion 50 of the gantry opposite the transducer is employed to support such an element 32 in contact with the ttransducer through the cement 31 and plate 12. The element 32 is provided with two arms 51 extending from the face furthest from the transducer. These arms are coupled by way of a coupling 52 to a pair of supports 53 which are attached to a vertical member of the gantry by a U-shaped fitting 54 so as to be slidable lengthwise when bolts 55 are loosened. In this manner, the supports 53 may be positioned anywhere along the vertical member and aligned with the transducer. The coupling 52 permits the assembler to force the element 32′ into contact with the transducer assembly. The gantry, due to its independent support and large size serves to prevent movement of the element 32′ when the wall 2 vibrates and as before compresses the transducer body so as to generate a conversion to electrical energy.

Figure 2:
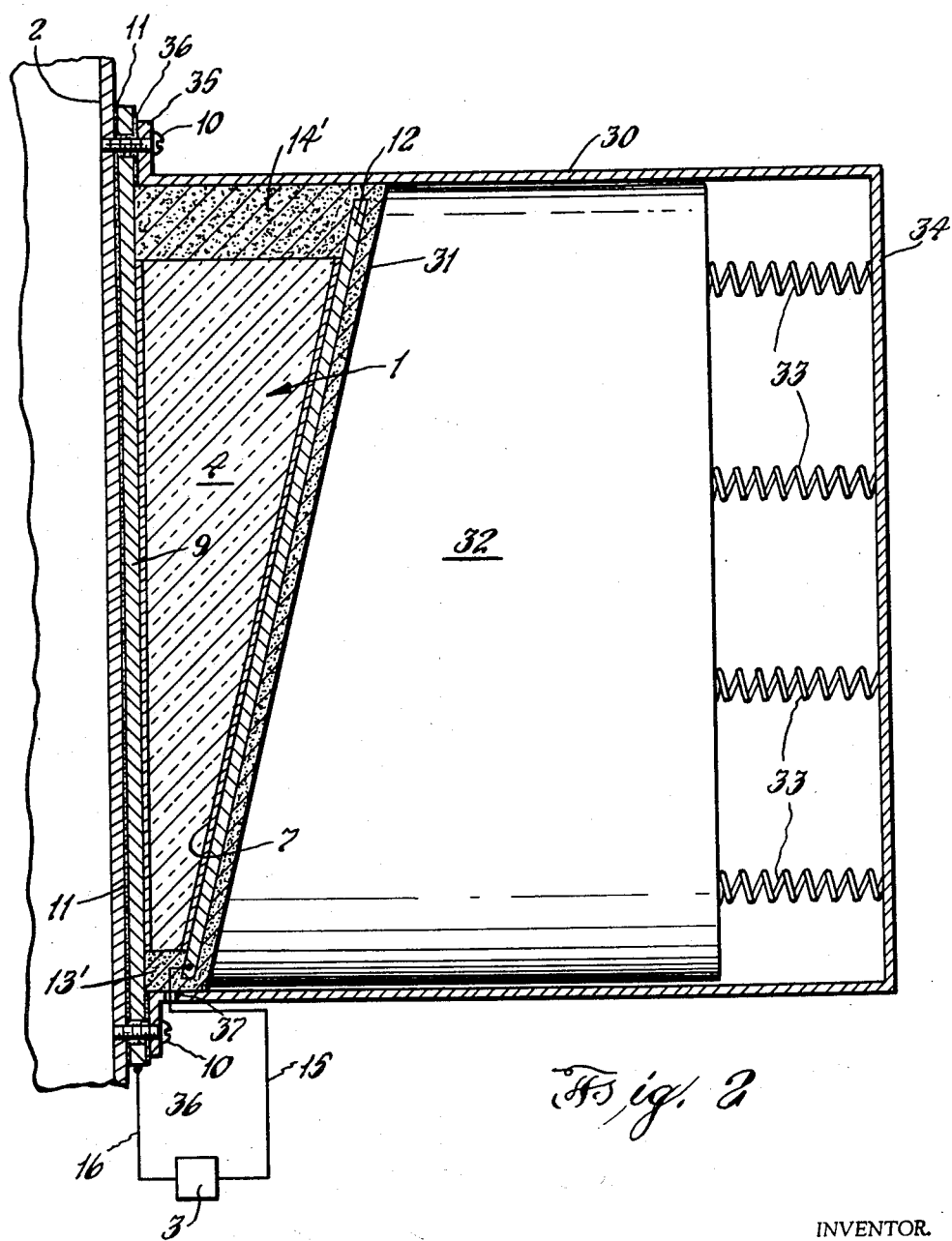
FIG. 2 is an elevation in section illustrating the application of this to a vibrating member.
Figure 4:
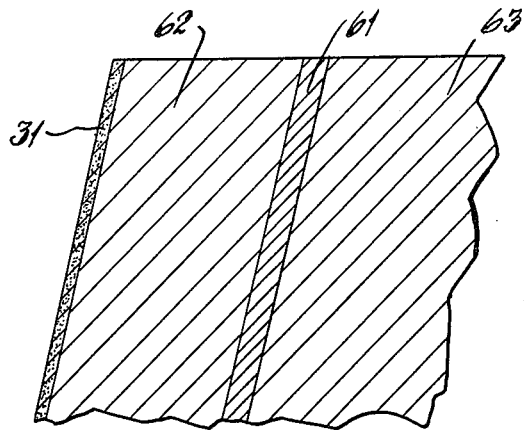
FIGS. 4, 5 and 6 illustrate in section the various inertial or loading elements used in FIGS. 2 and 3.
Figure 5:
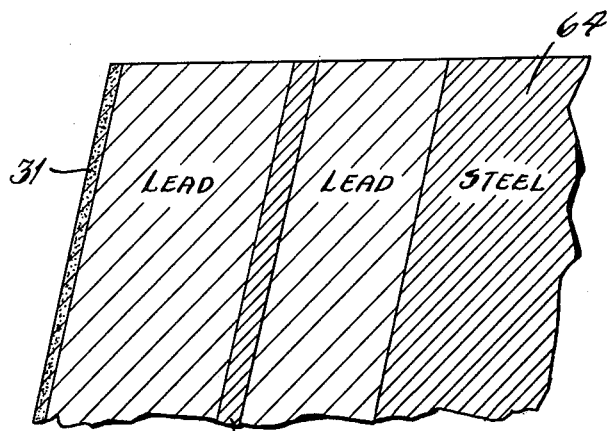
Figure 6:
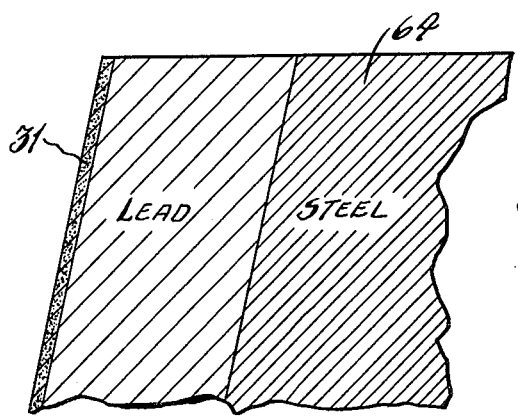

Certain improvements may be had by properly selecting the material and composition of the inertial elements 32 and 32′ of FIGS. 2 and 3 as for example, in FIG. 4, the element is composed of three parts, namely, a layer of sintered tungsten 61 sandwiched between two lead sections 62 and 63. The sintered tungsten layer is formed by employing a cement or filler binder to hold the tungsten particles and then the layer is tightly sandwiched between the lead layers. Alternately, the tungsten in a powdered form may be imbedded in a suitable plastic. The selection of a particular plastic is dependent on the temperatures encountered in the application. The entire element can be held thusly by a surrounding layer of resin or the layers cemented together. Carboseal may be substituted for the tungsten, both of which offer a high impedance to ultrasonic waves. The lead however, is a good absorber of ultrasound and together the layers serve to improve the release and conversion of the vibrational energy. In FIG. 5 a backing layer of steel 64 is added for rigidity and stiffness while in FIG. 6 the structure is simplified with the use of only two layers, one of lead and the other of steel. Other combinations are readily possible but only these have been illustrated for the sake of brevity.

Summarizing the concepts and embodiments of this invention it will be appreciated that the transducer body 4 may have opposite parallel, electroded faces, but since the ultrasound or high frequency vibrations produced by the missile or vehicle or its booster may cover a broad spectrum or band of frequencies, the wedge-shaped body 4 appears to be preferable, and responsive to the broadest possible band of frequencies of the vibrations, since each area of a different thickness of body 4 will respond best to a particular part of the frequency band, and together can be highly responsive to a broad frequency band. The particular electrostrictive material selected for the body 4 will depend upon the temperature and other conditions of expected use.

Barium titanate of uniform thickness responds to vibration frequencies of more than one fundamental frequency, but when in wedge shape its response to a broad band of frequencies is excellent.

Ultrasounds and very high frequency vibrations do not propagate in the same way as audible sounds and vibrations, and do not go out in all directions as a circular wave. There are few absorbents for ultrasounds and vibrations in the same nature as for audible sounds. Most solids and liquids are good transmission media for ultrasounds and vibrations. Air and vacuum are the best dampers for ultrasounds, but their use present a difficult muffling problem which cannot easily be solved by the use of a blanketing material.

The entire wall 2 does not have to be lined with transducers to effectively drain off the ultrasounds and high frequency vibrations. If the transducer is attached to one part of the wall, the vibratory pressure from a much larger wall area will be concentrated on the face of the transducer which abuts the wall. Once the vibrations of an area of the wall are concentrated on one face of the transducer, the mechanical forces so applied cause the production of a current in the transducer of the same frequency as the vibrations, if both are of one fundamental frequency. While all of this vibration may not be converted into an electric current, none will leave the system as ultrasound, and some will be reflected back and forth between the transducer body and the plate faces 9 and 12, and so be lost in attenuation in the material of the body 4. There will be some loss at each interface of bonding materials and some conversion to heat.

While this invention is primarily applicable to the damping of ultrasounds and high frequency vibrations in missiles and their boosters, the basic principles so employed may be applied broadly to the damping of other ultrasounds and very high frequency vibrations, where other or usual methods of damping are inadequate. The transducer system may be used in any application where a conversion of energy is desired from a vibrating wall or the like.

It will be understood that various changes in the details, materials, steps and arrangements of parts, which have been herein described and illustrated in order to explain the nature of the invention, may be made by those skilled in the art within the principle and scope of the invention, as expressed in the appended claims.

I claim:

1. A transducer device sensitive to a wide band of vibrations extending over a broad frequency band, which comprises an electrostrictive body of wedge shape having opposite electroded divergent faces, a metal plate disposed flat against each electroded face of said body, electrically insulating means securing said metal plates to said opposite, divergent, electroded faces of said body, electrical means for making external contact to said plates, an inertial mass element, an electrically insulating surface sandwiched between one face of said element and one of said plates, means supporting said element, said insulating surface and said plate in abutting relation, whereby when the other of said plates is attached to a wall of an object subject to vibration, the energy of said vibration over a broad frequency band in the object will be converted into electric energy.

2. The transducer device according to claim 1, wherein said insulating means is an epoxy resin.

3. The transducer device according to claim 1, wherein said wall is of an electrically conducting material and said other plate is insulated therefrom.

4. The transducer device according to claim 1, further including a dissipative utilization circuit connected by said electrical means to said plates.

5. The transducer device according to claim 1, wherein said means supporting said element includes a housing open at one end and having disposed and confined therein said body with said other plate facing outwardly of said open end, said element with its free face spaced from the rear wall of said housing, said element being free to move relative to said housing, resilient means urging said element into contact with said one plate.

6. The transducer according to claim 5, wherein said resilient means is a coil spring supported between said rear wall and said element having one of its ends abutting said free face and the other end abutting said rear wall.

7. The transducer according to claim 6 wherein said other plate is rigidly affixed to said housing and electrically insulated therefrom.

8. A transducer device sensitive to a wide band of vibrations for use with a space vehicle having an adjacent rigid fixed structure, gantry or the like which comprises an electrostrictive body of wedge shape having opposite electroded divergent faces, a metal plate disposed flat against each electroded face of said body, means securing said metal plates to said opposite electroded faces, means for supporting one of said plates against an outer wall of said vehicle, an inertial mass element, structural means carried by said gantry supporting one face of said element in tight abutting relation to the other of said plates, electrical means for making contact to said plates whereby when said body is compressed between said wall and said element and said wall vibrates the energy of said vibration will be converted into electrical energy.

9. The transducer device according to claim 8, wherein said element is of a dense heavy metal and an electrical insulator is interposed between said one face of said elerent and said other plate.

10. The transducer device according to claim 9, wherein said structural means comprises a lateral extension from said element in a direction toward and to said gantry and having its free end rigidly affixed thereto.

11. The backing element according to claim 12, wherein said layers are, a layer of tungsten embedded in an epoxy resin sandwiched between two layers of lead and a layer of steel abutting one of said lead layers.

12. An inertial backing element for an electrostrictive transducer which comprises alternate layers of lead and steel having a layer comprising powdered tungsten embedded in plastic interposed between said layers of lead and steel, all of said layers abutting one another and being approximately parallel to the face of said transducer abutting said backing element.

References Cited by the Examiner

UNITED STATES PATENTS

| | | | |
|---|---|---|---|
| 2,430,478 | 11/47 | Nelson | 310—8.9 |
| 2,691,159 | 10/54 | Heibel | 310—9.7 |
| 2,838,723 | 6/58 | Crownover et al. | 310—9.7 |
| 2,849,629 | 8/58 | Kissinger | 310—8.4 |
| 3,075,098 | 1/63 | Shoor | 310—8.4 |

MILTON O. HIRSHFIELD, *Primary Examiner.*